R. BONNEVIE.
COMPENSATING ELASTIC SUSPENSION DEVICE FOR VEHICLES.
APPLICATION FILED JAN. 18, 1908.

910,491.

Patented Jan. 26, 1909.

3 SHEETS—SHEET 1.

Witnesses:

Inventor:
Raymond Bonnevie
By Wm. E. Boulter
Attorney

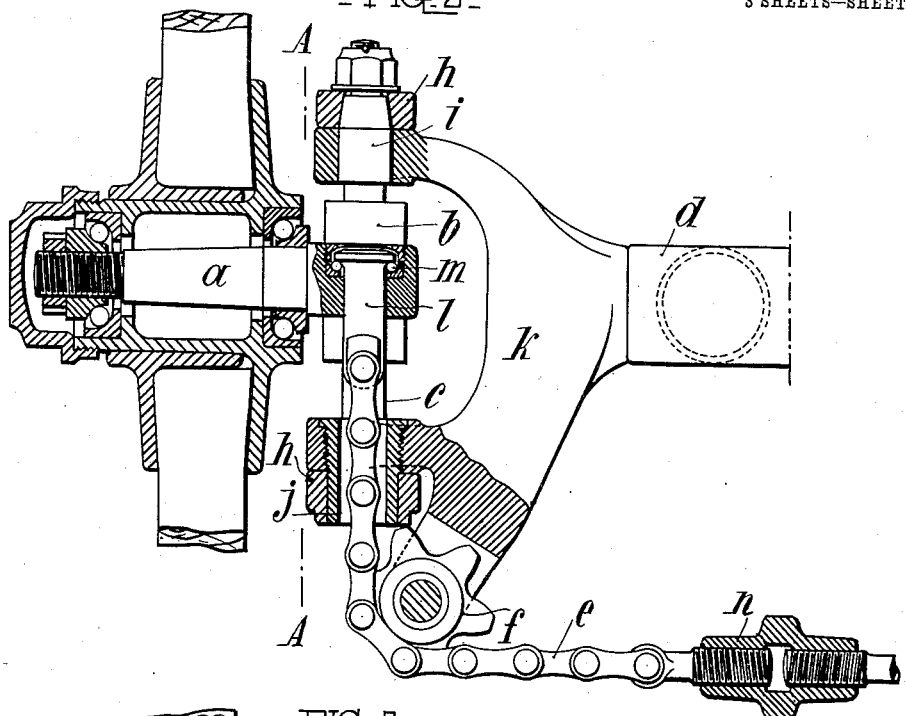
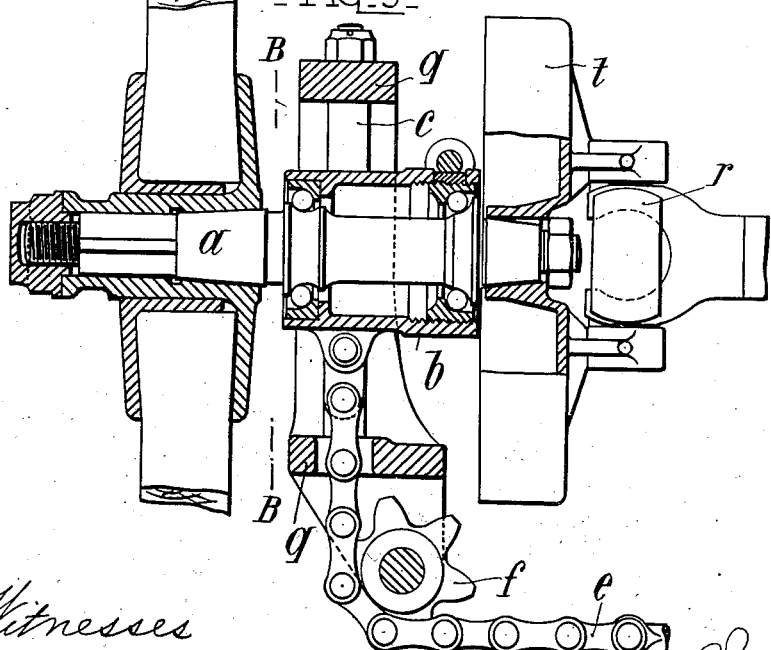

R. BONNEVIE.
COMPENSATING ELASTIC SUSPENSION DEVICE FOR VEHICLES.
APPLICATION FILED JAN. 18, 1908.
910,491.
Patented Jan. 26, 1909.
3 SHEETS—SHEET 3.
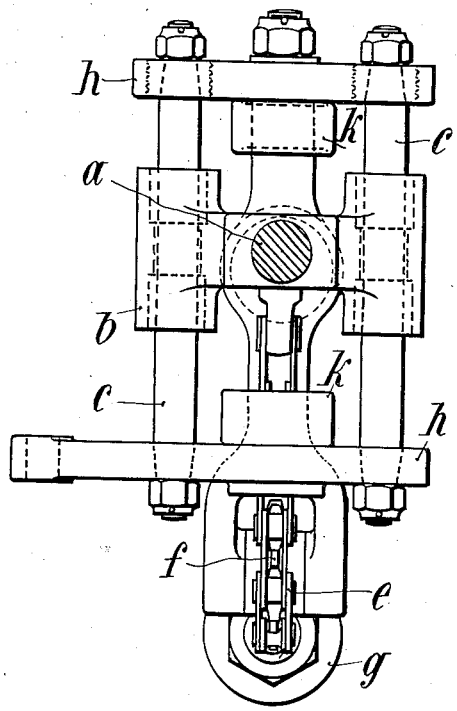
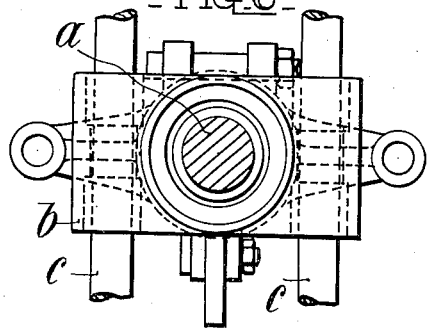

UNITED STATES PATENT OFFICE.

RAYMOND BONNEVIE, OF RIVE-DE-GIER, FRANCE.

COMPENSATING ELASTIC SUSPENSION DEVICE FOR VEHICLES.

No. 910,491.　　　　Specification of Letters Patent.　　　Patented Jan. 26, 1909.

Application filed January 18, 1908. Serial No. 411,508.

*To all whom it may concern:*

Be it known that I, RAYMOND BONNEVIE, a citizen of the Republic of France, residing at Rive-de-Gier, France, have invented certain new and useful Improvements in Compensating Elastic Suspension Devices for Vehicles, of which the following is a specification.

This invention relates to compensating elastic suspension devices for vehicles, the peculiar feature of which is that the ordinary spring blades are done away with, and replaced by elastic helical parts or other springs connecting the journals of the two wheels of one and the same pair. This arrangement makes it possible to compensate movements in opposite directions of the wheels relatively to the vehicle frame, which is thus relieved from shocks, which are produced by inequalities of the ground, while the vehicle at the same time remains perfectly balanced and elastically suspended.

Figure 1:
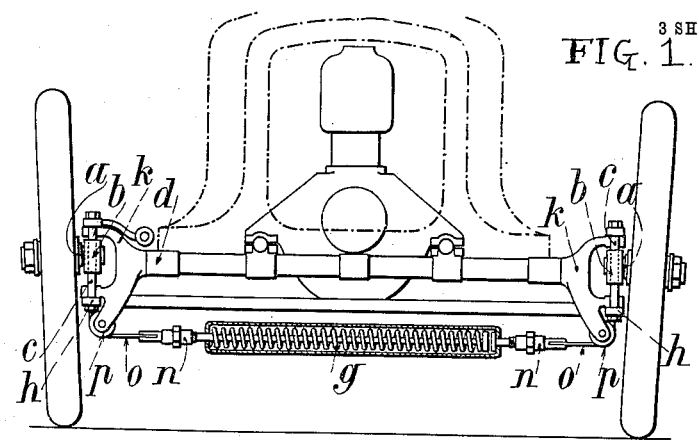
Figure 4:
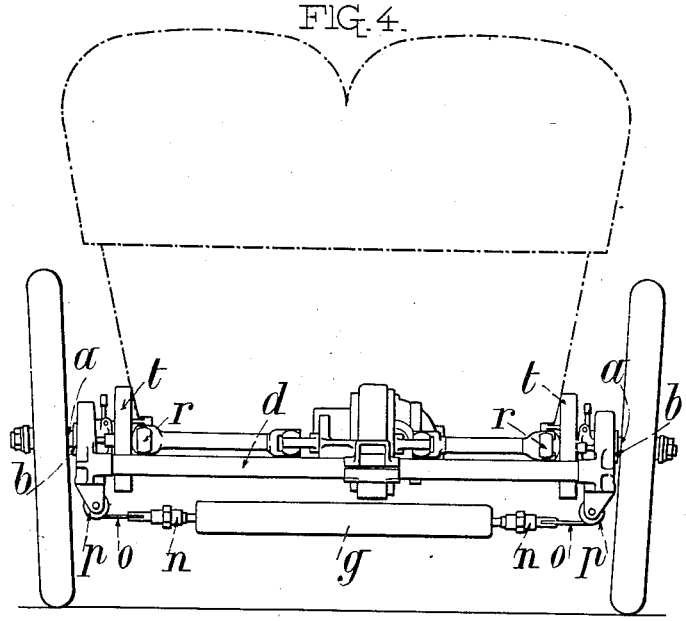
Figure 7:
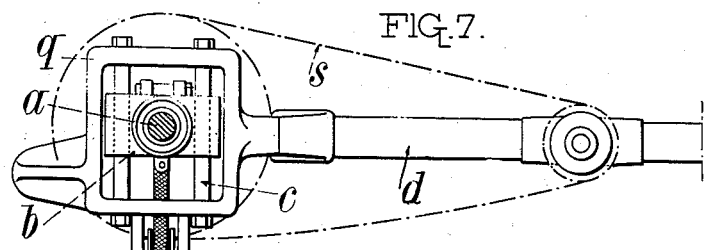

In the accompanying drawing given by way of example Figure 1 is a front elevation of a motor car showing a device according to this invention, applied to a vehicle having wheels with pivoted journals. Fig. 2 is a vertical section, on an enlarged scale, of a detail of construction corresponding to the arrangement shown in Fig. 1, Fig. 3 is a section on the line A—A of Fig. 2, Fig. 4 is a rear elevation of a car provided with the device applied to the non-steering wheels, Fig. 5 is a vertical section on the same scale as Fig. 2, of a constructional detail corresponding to the arrangement shown in Fig. 4, Fig. 6 is a cross-section on the line B—B of Fig. 5, Fig. 7 is a partial back elevation of a car showing the application of the invention for chain driving.

In this device, the journals $a$ of the pair of wheels are arranged in slide blocks $b$ capable of vertical movement on suitable guides $c$ secured to the frame or chassis $d$. These journals are connected together by cables, belts or chains $e$ passing over guide rollers $f$, also secured to the frame $d$, the horizontal portion of the said cables, belts or chains $e$ being provided with elastic devices, such as helical springs, which will permit variable movements of the journals $a$ which at the same time are still elastically connected together. This device gives compensated elastic suspension of the two wheels of one and the same pair as will be hereinafter explained.

When the device is applied to a pair of steering wheels as shown in Figs. 1, 2 and 3 the guides $c$ of the journals $a$ are arranged in frames $h$ mounted so that they can pivot about a vertical spindle or axis.

The trunnions $i$ $j$ of the frames $h$ are supported in branches of arms $k$ rigidly secured to the frame $d$. The bottom arm of the part $k$ is extended downwards and carries the guide roller or pinion $f$ (Figs. 2 and 3) over which passes the cable or chain $e$, one end of which is connected to the corresponding slide block $b$ and the other end to the spring $g$. The vertical portion of the chain $e$ is situated in the axis of rotation of the frame $h$, and to that end passes through the trunnion $j$ which is tubular. The part connecting the chain $e$ to the slide block $b$ is constituted by a shaft $l$ provided with a stop collar resting on a series of balls $m$ arranged in the slide block $b$.

A nut or union piece $n$ provided with opposite screw-threads is arranged between the chain $e$ and the corresponding end of the spring $g$, so as to enable the tension of the latter to be regulated.

When a cable or a belt $o$ is used instead of the chain $e$, as shown in Figs. 1, 4 and 7, the pinion $f$ is replaced by a pulley $p$.

When the device is applied to a pair of wheels with invariable rolling plane that is to say to non-steering wheels as shown in Figs. 4, 5 and 6, the guides $c$ of the journals $a$ are arranged directly in the frames $q$ or in brackets secured to the frame $d$, the said frames or brackets being capable of forming constituent elements of the longitudinal members of the vehicle frame. In this arrangement, the slide block $b$ can move vertically without any pivoting, so the chain $e$ or the belt $o$ is connected directly to the slide block $b$.

The transmission of driving power to the wheels can be effected either by Cardan shafts $r$, as shown in Figs. 4 and 5, or by a chain $s$ as shown in Fig. 7. For this latter arrangement, it is sufficient to do away with the universal joint $r$ and provide the brake drum $t$ with teeth corresponding to the driving chain used.

It is obvious that the elastic device $g$ can be arranged so as to act by traction as well as by compression, the chains, cables, or belts being capable of being connected to the said device either directly or by means of coupled parts comprising the said device between them.

The parts $b$ of the journals $a$, instead of being arranged with sliding guides $c$ secured to the chassis, in the case of non-steering wheels, or secured to frames $h$ mounted so as to be capable of pivoting about a vertical axis, in the case of steering wheels, could be permanently secured to their corresponding guides $c$ which would then slide either in frames secured to the vehicle frame or in pivoted frames $h$.

In accordance with these constructions, when two wheels of one and the same pair pass, one over say a gutter, and the other over a projection on the ground, the wheel which passes in the gutter descends relatively to the vehicle frame while the other one rises owing to the connection of the said wheels. If the differences of level are the same for the two uneven portions of the ground, there is exact compensation in the two sliding movements of the wheels in opposite direction relatively to the vehicle frame, so that the spring does not come into play but merely follows the movement of the connecting part, cable, belt or chain. On the contrary, if the differences of level in question are not equal, the spring intervenes in order to compensate the inequality in question by absorbing or giving out by tension or by expansion the greater or less excess of the chain or belt connecting the journals of the two wheels.

When the two wheels of one and the same pair pass over differences of level of the same kind, the shocks resulting therefrom are horizontally absorbed by the elastic device and do not affect the vehicle frame which is thus not subjected to any considerable change of level.

What I claim as my invention and desire to secure by Letters Patent is:—

An elastic compensating suspension device for vehicles with pivoted journals, comprising the combination of elastic members arranged transversely of the vehicle frame, and connected by cables, belts or chains to the journals of the two wheels of one and the same pair, slide blocks to which the journals are connected, and guides for said slide blocks capable of pivoting with the wheels.

In testimony whereof I have signed my name to this specification in the presence of two subscribing witnesses.

RAYMOND BONNEVIE.

Witnesses:
   MAURICE BERTIN,
   LOUIS ALBERTIN.